May 30, 1967 E. J. FORBES ET AL 3,322,027
INFORMATION HANDLING SYSTEM AND RECORD ELEMENTS THEREFOR
Original Filed Feb. 24, 1961
FIG. 1
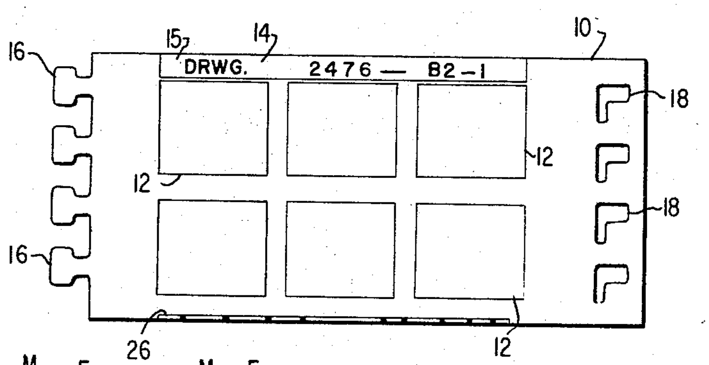
FIG. 2a FIG. 2b
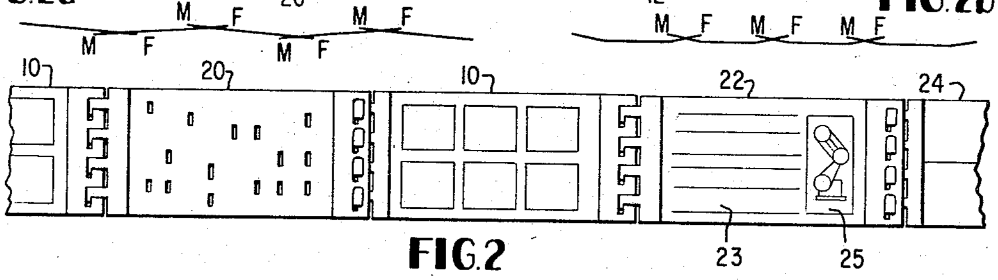
FIG. 2
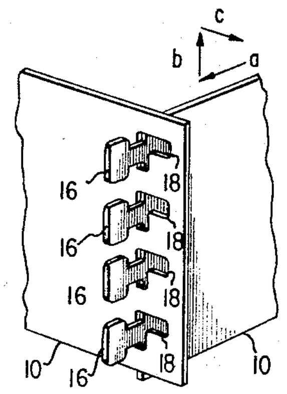
FIG. 3
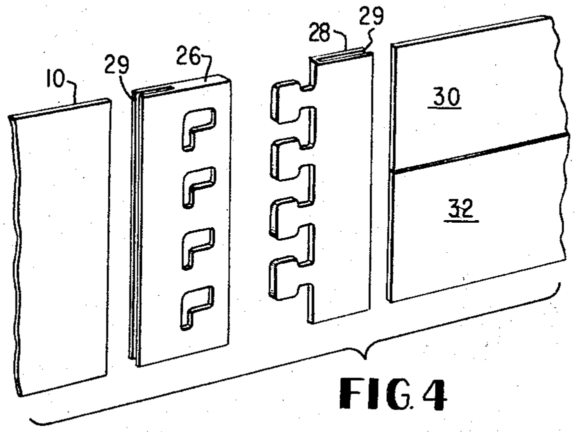
FIG. 4
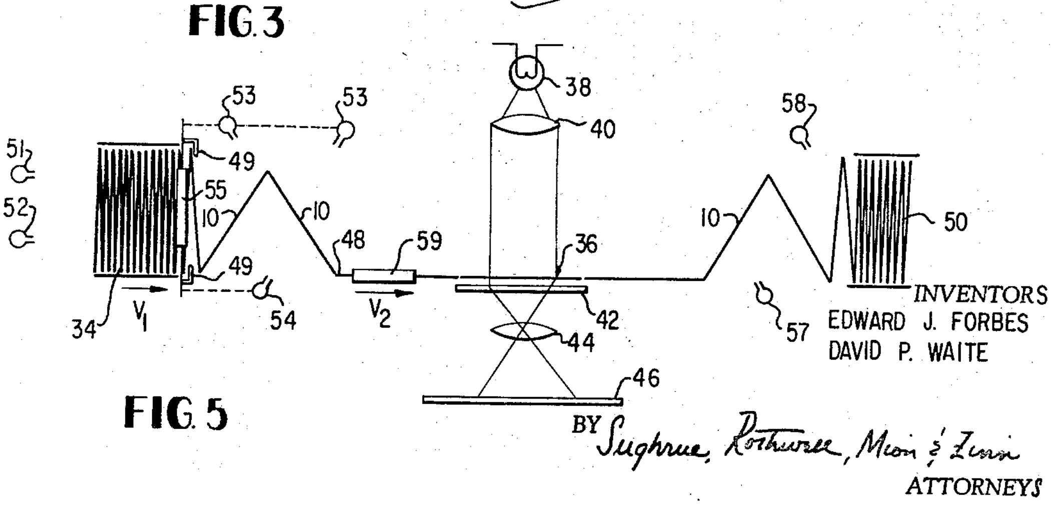
FIG. 5
INVENTORS
EDWARD J. FORBES
DAVID P. WAITE
BY Sughrue, Rothwell, Mion & Zinn
ATTORNEYS 3,322,027
INFORMATION HANDLING SYSTEM AND RECORD ELEMENTS THEREFOR Edward J. Forbes, 7 Autumn Lane, Wayland, Mass. 01778, and David P. Waite, 42 Ipswich Road, Topsfield, Mass. 01983

Original application Feb. 24, 1961, Ser. No. 91,489. Divided and this application July 7, 1964, Ser. No. 390,497
3 Claims. (Cl. 88—24)

This application is a division of our prior application, Ser. No. 91,489, filed Feb. 24, 1961, now abandoned.

This application relates to a system for information storage and retrieval, particularly graphic information.

In the field of information handling, particularly graphic information storage, retrieval, and reproduction, there is need for a uniform approach to the problem wherein one universal automatic system may be utilized for a number of different ways to solve various problems.

There is a rapidly increasing amount of graphic information which is required to be supplied on demand by copy services. Many agencies of the government and private oraginzations supply scientific documents and other graphic information to fulfill hundreds of requests on demand each day. Needless to say, such systems which utilize manual request sorting and manual document selection employ a large number of people and have high operating costs. Mechanization of the information selection and automated document processing would considerably reduce the high expenses of the present known systems.

A particular problem involved in graphic information storage and retrieval systems is created by the fact that the document request activity varies considerably for different documents. Usually there are considerably less requests for the older documents than for recent documents. The distribution pattern of request activity throughout the entire volume of a document file is of basic importance. Because of the low request activity in the large segment of the file, it is highly desirable that parallel access be utilized to select the desired documents to be copied. However, in filling requests on a high production basis, it is desirable to have a continuous flow line of work especially the output product; in other words, a continuous copy printing machine that is operating on a web feed of material and produces an output copy product on a continuous flow basis. For the most economic operation, the fact that the documents must be selected by parallel access and the copy output provided on a continuous flow basis creates a problem in automating an information handling system.

Electronic data processing can provide parallel access to information in a file and serial readout of the information but in several problem areas of information storage and retrieval it is not practical to handle information in digital form. For example, graphic information such as text, charts, drawings and the like must be handled utilizing recording media such as photographic film or video magnetic tape. In particular, photographic microfilm has become a powerful tool in recording documentary data in microimage form and has become a basic element employed in the known attempts to mechanize graphic information storage and retrieval systems.

The known microfilm systems for graphic information storage and retrieval may be generally classified in two general approaches to the problem involved. One approach is the use of roll film or a continuous web of microfilm. Another approach to the microfilm handling problem has been to provide a plurality of standard size pieces of microfilm unit records chosen for convenience in handling and machine design. The roll film approach as well as the photographic unit record approach both have their advantages in that one can solve the problem of continuous copy printer flow output while the other allows parallel access to individual documents, but both approaches also have inherent disadvantages because a universal information handling system requires parallel access to select the information and ability to handle information in a continuous flow for readout of the selected information.

Roll film provides a continuous web feed for high speed copy or readout but does not provide parallel access for selecting a desired portion of the file for readout; whereas unit records provide parallel access without handling excessive quantities of adjacent information but do not provide continuous web readout. Unit records allow purging and up-dating of information in the file by mere removal or substitution of a unit record but do not provide low cost transportation of the information from station-to-station within the same physically connected equipment. The unit record concept permits merging, sorting and arranging into desired order; whereas the roll film concept is committed to a position of information in a storage roll and refiling may only be done by replacing the roll or conventional film splicing. However the roll film is of a size large enough to reduce the likelihood of becoming lost; whereas the unit records are small individual records which may be dropped on the floor or otherwise lost from the file. In summary, roll film provides high speed access only when the desired information is adjacent or very near the information presently being readout and provides high speed readout; by comparison unit records provide greater simultaneous use of information because of the frequent physical separation within the total body of information.

Unfortunately, very few information storage and retrieval problems fall neatly into an area which can be adequately solved either by a roll film approach or a unit record approach. Accordingly, applicants have provided an information-handling system which combines the advantages of parallel access to stored information and continuous web feed for high speed readout and, in addition, provides high speed selection of a portion of a web to be read out while allowing readout at conventional speeds. Furthermore, the information-handling system of the invention eliminates passing each information-bearing unit across a readout station in face contact therewith so that substantial amount of wear and scratches occurring in handling of the conventional web film will not occur in this information-handling system. The system of this invention further allows the merging, sorting, arranging, purging and up-dating of information in a file as well as parallel access by means of providing unit records, but further provides a continuous web feed for high speed readout machines as well as a low cost of transporting the information from station-to-station by means of connecting the unit records together in a chain so that it may be handled as a continuous web.

This invention provides a solution to the problems enumerated above by means of quick connectable hinged individual unit records which may contain graphic information thereon. These unit records are provided with male and female couplers at each end thereof so that they may be rapidly connected or disconnected into a train of like unit records to provide a web composed of quick connect and disconnect elements. The edges of the elements in that web are collinear and the quick connect and disconnect couplers on each end of each unit provide that the web may be folded in zig-zag or accordion fashion, as well as extended flat or rolled up. For certain other problems, the unit elements may be handled individually. Thus, the unit record elements and the system of this invention provides a universal system for graphic information-handling problems.

It is obvious that the unit records with the quick connect and disconnect couplers on each end thereof can be assembled in a desired sequence after parallel access for selection and handled in roll film fashion using conventional roll film-handling equipment such as viewers, printers, enlargers, roll film printers, electrostatic printers and the like. After such use the unit records can be quickly disconnected and returned to storage as individual record units available for subsequent parallel access.

The unit records with the quick connect and disconnect couplers on each end thereof may be provided from a roll of microfilm by merely stamping the connectors therein and separating the film into discrete elements with couplers on opposite ends thereof. In addition, the couplers may be separately applied high strength materials which may be applied to existing unit records in the form of microfilm to adapt them to the system of this invention. Furthermore, couplers may be attached to a variety of different types of record media such as photographic film, magnetic tape, punched tape, punch cards and the like, providing the record material has adequate strength and common width dimensions so it will function as a continuous web when assembled in end-to-end relationship by means of the quick connect and disconnect couplings.

After parallel access and selection of desired unit record elements, they may be assembled together in a chain and the chain may be arranged in zig-zag or accordion fashion. When the record elements are assembled face-to-face in giz-zag or accordion fashion, they are still coupled and the coupling functions as a hinge from one element to another. The hinge-coupler also provides a spring action which biases the adjacent elements to return from a flat web position to a unique zig-zag fold at alternate hinge points. The accordion or zig-zag fold may then be separated and unfolded directly into a continuous flat web portion at a readout station. The unfolding may be automatic in accordance with sensed information prerecorded on the edge of each unit record. In other words, each record may be coded on one or more edges thereof and this unique code may be detected by machine means such as magnetic transducers to control the flattening out of the zig-zag fold into a flat web at a readout station. In this manner very high speed scanning of edge code data can be done with very little motion of the stacked record assembly.

This geometrical arrangement of the zig-zag fold with a flat folded out portion at a readout station has inherent advantages in that the velocity or movement of the compressed stack of accordion folded unit records past a sensing station for reading of the edge coded data for the purpose of selection is at a very low rate of speed for a relatively fast speed of the unit records moving as a flat web past a readout station. Thus, the system provides extremely high speed scanning of individual connected record elements with low velocity movement of the compressed stack of unit records being scanned, as well as high speed readout of the information from the web which is flattened between sections of the compressed stack of zig-zag folded unit records. It is practical with edge code scanning of zig-zag folded unit records to have a scanning rate up to one hundred times faster than the highest practical rate of scanning flat continuous webs. It can also be seen that there will be no wear on the accordion folded compressed stack portion of the web while in the zig-zag folded condition, as wear occurs on the flat faces of the web as they are being handled. Thus, there will be considerably less wear on the unit records of the subject system, the only wear being when they are flattened out at a work readout station.

A better understanding of the invention together with further objects and advantages thereof will be better understood from a consideration of the following description taken in connection with the drawings.

In the drawings:

FIG. 1 is a plan view of an information record link element of this invention;

FIG. 2 is a plan view of a plurality of links as shown in FIG. 1 connected together in a chain to form a web;

FIGS. 2*a* and 2*b* are side elevation views illustrating alternate arrangements for connecting the element links together to form a chain or web;

FIG. 3 is a perspective view of adjacent links illustrating one type of male and female quick detachable connectors and the operation of establishing a coupling;

FIG. 4 is a perspective exploded view illustrating a modification of this invention wherein the quick detachable male and female connectors are in the form of applied elements attached to the ends of individual unit records;

FIG. 5 is a schematic view of an information-handling system utilizing a plurality of the unit record elements or links connected together in zig-zag fashion to form accordion folds which may be flattened out at a readout station.

Referring to the drawings, a unit record element or link 10 is constructed of photographic film material and may contain thereon graphic information. For example, the unit record element or link 10 may be completely composed of microfilm with a plurality of frames 12 of graphic information contained within the film. In addition to the graphic information on the microfilm, unit record element 10, there may be provided visible information 14 along any visible area on the film record element 10. For example, the visible information may be placed on a white ink base 15 and may contain magnetic binary coded information applied by a suitable printing machine. The visible information may be used for the purpose of indexing and for code controlled record access. Each unit record element 10 is provided with a configuration at opposite ends thereof which function as quick detachable hinged connectors. At one end of the record T-shaped extensions 16 protrude longitudinally from the record, while at the opposite end of the record element 10 L-shaped holes 18 are provided. The L-shaped holes are slightly offset from the axis of the T-shaped extension 16 so that when made at the edges the longitudinal edges of adjacent unit records 10 may be aligned. The T-shaped extensions and L-shaped holes are preferably formed without sharp edges or corners to alleviate undue stresses while being handled. The connector configurations may be formed by means of a hot punch for providing the rounded corners.

In addition to the visible index information 14 which are provided with a magnetizable track 26 along one or more edges thereof. This magnetizable track may have suitable magnetically coded information (either digital or analog) thereon for the purpose of identifying by this code the graphic information 12 contained on each unit record 10. Such identification is quite valuable in locating a particular unit record in a chain of records as will be apparent as the discussion proceeds.

FIG. 2 shows an information element record chain 17 with the record element 10 hooked together with similar records and each record has identical male and female couplings 16 and 18 on opposite ends thereof. Because of the versatility of the record elements, various other types of machine readable information other than graphic information on microfilm may be carried thereon. For example, record 20 may be a perforated record element in the form of the well known perforated statistical card, e.g. (electronic accounting machine) card. Record 22 may be a record having magnetic information 23 thereon, either alone or together, with graphic information 25 as shown. Record 24 may have two separate record media joined together by a common end splice which also functions as a connector. The chain 17 may be assembled by parallel access and selection of the various unit records and may then be handled by many presently available roll film copy and processing machines, and other machines having sensing means for reading recorded information fed in web form such as magnetic tape, punched tape, and the like.

In record element link 22 the magnetizable coating 23 covers nearly the entire surface of the unit record link, while the remaining area contains graphic information 25. This particular configuration may be utilized as a combination storage medium for graphic records plus office dictation carried on magnetizable coating 23, which dictation could relate directly to the graphic information or instructions on how later business operations were to be conducted relative to the graphic record.

FIG. 3 shows a pair of unit records 10 and the manner in which the quick coupling is accomplished. The coupling and/or uncoupling may be manual or by means of various mechanical couplers such as a small hand held unit for various lengths of record chains or a high speed coupler for coupling or uncoupling a deck of individual record elements. The T-shaped protrusions 16 forming one portion for accomplishing the coupling are extended through the narrow portion of the L-shaped hole 18 which extends transverse to the longitudinal axis of the record. After the T-shaped extension is inserted through this portion of the hole 18 by a movement corresponding to arrow *a*, the record element containing the protrusion 16 is moved transverse to the longitudinal axis of the unit record in a direction indicated by the arrow *b* so that the narrow neck of the T-shaped extension 16 is aligned with the widest part of L-shaped hole 18. Subsequently, the records may be moved relative to each other in the direction of the arrow *c* to accomplish the connections with the neck of the T-shaped extension 16 in the outer edge of the widest portion of the L-shaped slot 18. At this time, the outside edges of the individual unit record elements 10 will be aligned as shown in FIG. 2. This coupling requires three different relative movements to prevent accidental uncoupling. When the coupling is made the adjoining records are hinged for 180° movement from a position in end-to-end relationship to an abutting face-to-face relationship.

FIGS. 2*a* and 2*b* are side views of an assembled web or chain of unit record elements with alternate connecting arrangements. The male couplers 16 are designated M and the female couplers 18 are designated F. FIG. 2*a* is a side elevation of a web connected as shown in FIG. 2 with the ends of the unit records at the connections being on alternate sides of the web facilitating a zig-zag fold. FIG. 2*b* illustrates a connected chain with the extending ends of the unit record elements all on the same side of the web. The FIG. 2*b* construction is especially useful if the chain is to be used as roll film in present roll film handlers.

FIG. 4 is an illustration of another type of coupler which may be utilized. The unit record 10 shown in FIG. 1 may have the male and female couplers formed by T-shaped extensions 16 and L-shaped holes 18 formed in a roll of chopped film. This roll of film may be an existing film roll so that presently existing microfilm files may be automated by the system of this invention. Alternatively, to make unit record elements by chopping an individual film, there may not be enough space between frames to form the couplers, or for other reasons, such as strength and wear resistance, it may be desirable to form separate couplers which can be integrally applied to the ends of unit records. As shown in FIG. 4, these couplers may be in the form of separately applied elements 26 and 28 functioning as the female and male components, respectively, of the quick detachable coupling. The elements 26 and 28 may be formed of thin (.002 inch thick) high-strength transparent material such as that sold under the trademark Mylar, having a pressure sensitive or heat sensitive adhesive surface 29 on the inside thereof for joining two individual unit records 10. Male element 28 is similarly constructed and may be formed of a doubled over layer of Mylar which can be suitably dispensed in the preformed elements from a roll or the like.

The unit record to which the male coupling 28 is applied shows another modification of the invention. In this case, the unit record consists of two different record media 30 and 32 which may be joined together by the means of an applied end coupling to form a single unit record. Of course the elements 30 and 32 must have chemical compatability, be of sufficient strength, similar thickness and expansion coefficients to operate satisfactorily.

Various forms of quick detachable 180° hinge couplers may be used so long as they fulfill the requirements set out above. It should be noted that the couplers illustrated include a built-in polarization that requires two record elements to be in a unique position before they can be assembled. If the emulsion layer of two film record elements are on the top side of the element configuration, it is evident that the two elements cannot be properly joined unless the emulsion sides of the film remain on the same side of the resulting web. The edges of the individual record elements may also be rounded and the effective edges provided by applied couplings 26 and 28 may also be soft and rounded.

A system for handling the unit record elements to provide readout on a continuous basis from selected records is shown in FIG. 5. The records may be selected by parallel access or may be selected by other means and assembled as shown in FIG. 2, for example, into a chain of elements. This chain is then folded in accordion or zig-zag form 34 so that the faces of the records will be abutting one another. The folding and unfolding to and from roll form may be accomplished by automatic folder means. A readout station 36 may be provided with a suitable source of illumination 38 and optics such as schematically illustrated condensing lens 40, together with an unobstructing gate element 42 including vacuum hold-down and projection optics 44 for projecting on a viewing screen 46 or onto a continuous flow copy printing machine in the place of screen 46. The unit record links 10 pass from the accordion fold compressed stack 34 to a position where they are folded out flat at 48 for passing in front of the gate 42 for readout. After being read out, the elements 10 are again folded up into accordion or zig-zag fold as at 50.

The compressed stack may be supported in a variety of positions in space by suitable mechanical guide means. One method which will prove satisfactory when the continuous web is not intended for roll form utilizes short rods imbedded in the end of the female coupler 16 which acts as hangers protruding out from the sides at the top of stack 34. The outer extremities of these pins ride in shallow grooves in side walls placed adjacent to the compressed stack or on rails placed adjacent to the sides of the compressed stack. Where compatability with roll form use of the continuous web is required, a compressed stack may be stored in an upright position supported by the integral stiffness of its individual elements in addition to side supports. Such self support is easily obtained if the stack rests with the elements on the longest dimension so that the zig-zag is in a horizontal rather than vertical plane.

Air jets 51, 52 or other suitable biasing means are provided for creating an air piston for biasing the compressed folded stack 34 toward the readout station while other air jets 53 and 54 and a mechanical insertable finger 49 are selectively actuatable (either manually or by preprogrammed controls) to assist in folding out selected elements 10 to a flat web portion 48 as illustrated. The selectively operable jets 52 and 53 are under the control of sensing means 55 such as magnetic transducers or the like which read the edge coded data 26. If a selected element is desired to be viewed the transducers sense the edge coded data on the selected element and aid in energizing or controlling the air nozzles 53 and 54 for folding out the web portion containing the selected element. Similar air jet nozzles 57 and 58 are continuously operable to assist in folding up the web again into zig-zag fashion to form a compressed stack 50 and for biasing the compressed stack away from the readout station. Another sensing transducer means 59, which could function as a low speed serial reader, is provided along the edges of the flat portion 48 of the record chain.

Thus, after the proper accordion pleat determining the particular unit record to be read has been located by the sensing means 55 and/or 59 or by visual means, the fold can be opened at that point by separating the major bulk of the compressed folds on each side of the unit record of interest.

As an alternative construction, not shown, and to provide for a simplification in electronic components and circuit logic, a partial expansion of the zig-zag stack may be produced as it passes the scanning head. This can be easily accomplished by opposing air nozzles positioned adjacent to the stack at the element hinge point locations. If one air jet is turned on and is directed into an open pleat, it will pull the next pleat partially open and in position to be further opened by a jet of air if turned on by the opposing air nozzle. The two air jets, controlled by the sensing means to occur in a sequential manner, will step successive elements through a partially expanded zig-zag area in which the sensing means 55 is located. Since one element at a time goes through the sensing area, inclined at a substantial angle, each bit of information recorded on the magnetic strip is read serially in time, and therefore can be read by a single sensing element of sufficient length to be intercepted by the location of the full pattern of bits stored on the magnetic strip.

Entire sections of the compressed stack 34 can be passed at extremely high speed past the readout station 36 without obstruction because sufficient space is provided between condenser 40 and gate 42. This arrangement provides selective access in accordance with the sensing of the edge coded data on adjacent record elements. The speed with which large segments of the total collection of information can be sensed and jumped over is quite phenomenal and is inherent in the geometrical construction. Entire collections or large subdivisions thereof may be rapidly fed past the scanning means 55 because of the high speed of edge scanning of the compressed stack. It is evident that the velocity of the compressed stack 34 indicated by arrow $v_1$ will be substantially less than the velocity of the folded out web portion 48 indicated by arrow $v_2$. By leaving a stationary zone in the transport mechanism which is indicated schematically by the air control, the scanned portion of the compressed stack can be brought to a rest position while the scanning mechanism goes back to the next portion of the unscanned compressed stack 34 to pick up the next bite of material to be edge scanned. For example, the transducer 55 may be movable back and forwards along the edges of the compressed stack 34 or the compressed stack may be movable in sections.

It is apparent that the transportable compressed stack will have very low wear thereon because of the manner in which the images on the recording surfaces of the unit record 10 are packed face-to-face in the stack 34 and only opened and moved across the readout station when desired. This contrasts sharply with the roll film concept wherein each frame on the roll is subject to scratches whenever the roll is handled to select a particular frame. The low wear feature of this invention complements the higher available cycling speeds by the high speed scanning and the combinations of these features means that large information files can be cycled in short times repeatedly many times per day without subjecting them to the same exposure to wear and scratching that would occur in roll film systems.

Although the system has been described for operation in one direction it will be evident that it may be operated in either a forward or reverse direction.

While there have been shown and described and pointed out the fundamental novel features of the invention as applied to the disclosed preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An information handling system comprising: a plurality of information bearing unit record links containing quick detachable hinged couplers on opposite ends thereof, said links being assembled together to form a chain of similar links and said chain of links being folded in zig-zag fashion to form a compressed stack, a detachable edge coding on the edge of said links, a support for said compressed stack of links, means for moving said chain of links, a readout station for said links when folded out flat, said readout station allowing said compressed links to pass therethrough, sensing means for sensing a predetermined detectable edge coding on the edge of one of said links and fold out means responsive to said sensing means for folding out the sensed link flat for readout.

2. An information handling system as defined in claim 1 further comprising, fold up means on the side of the readout station opposite said fold out means, said fold up means acting to fold up the links which are spread out flat for readout.

3. A graphic information handling system comprising in combination: a plurality of unit record links of photographic film chips bearing recognizable graphic information thereon, quick detachable male and female couplers on each end of each link allowing said links to be hingedly connected for movement from one plane through 180° into face abutting relationship, means defining coded information on magnetized areas on at least one edge of each of said links, a compressed connected stack of said links formed from a chain of said links connected together and folded in zig-zag fashion, an optical readout station employing projection optics means for projecting and reading out the graphic information on individual record links when said links are unfolded from said compressed stack and spread out flat, the optical readout station also allowing the compressed stack to pass therethrough without being spread out flat, means biasing said compressed stack toward said optical readout station, sensing means including magnetic transducers for sensing the edge coded information on each of said links, selectively operable fold out means cooperating with said compressed stack ahead of said optical readout station operative in response to commands from said sensing means to selectively fold out a predetermined portion of said compressed stack into flat spread out position for optical readout, and fold up means operable to fold up the spread out links into a zig-zag folded compressed stack.

References Cited

UNITED STATES PATENTS

| | | | |
|---|---|---|---|
| 2,081,264 | 5/1937 | Breen. | |
| 2,124,906 | 7/1938 | Bryce. | |
| 2,573,557 | 10/1951 | Field | 88—28 |
| 2,594,358 | 4/1952 | Shaw | 88—24 |
| 2,981,411 | 4/1961 | Azari. | |
| 3,045,529 | 7/1962 | Kuehnle | 88—24 X |
| 3,103,850 | 9/1963 | Khowry et al. | 226—97 X |
| 3,202,045 | 8/1965 | Arsenault et al. | |

FOREIGN PATENTS

| | | |
|---|---|---|
| 793,717 | 4/1958 | Great Britain. |

NORTON ANSHER, *Primary Examiner.*

V. A. SMITH, R. A. WINTERCORN, *Assistant Examiners.*